UNITED STATES PATENT OFFICE.

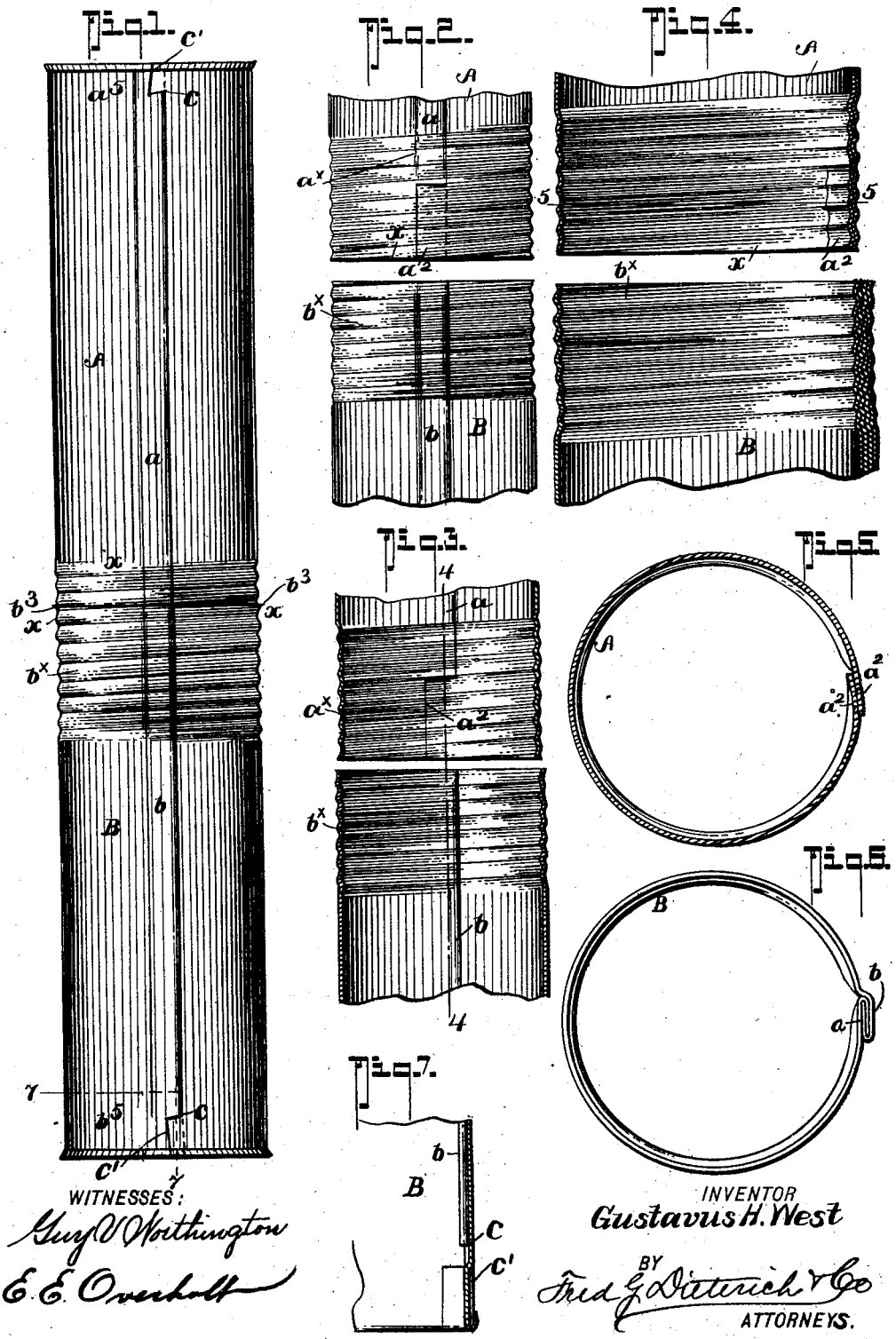

GUSTAVUS HANNIBAL WEST, OF WACO, TEXAS.

METAL-PIPE JOINT.

SPECIFICATION forming part of Letters Patent No. 721,114, dated February 17, 1903.

Application filed April 11, 1902. Serial No. 102,459. (No model.)

*To all whom it may concern:*

Be it known that I, GUSTAVUS HANNIBAL WEST, residing at Waco, in the county of McLennan and State of Texas, have invented a new and Improved Metal-Pipe Joint, of which the following is a specification.

My invention relates to improvements in that class of sheet-metal-pipe joints in which the ends have threads or corrugations for interlocking; and the same primarily seeks to provide a pipe-joining means of the character noted of a simple and inexpensive construction, by which a very compact and effective joining of two pipe-sections can be accomplished and in which the parts are especially designed to provide for a quick and positive interlocking of the pipe ends without unnecessary binding.

In its general nature my invention comprehends two pipe-sections having their opposing ends formed with compressed crimps or threads and in which each section has its meeting edges joined by a special construction of bead or clamping surface, the said clamping-surfaces at the corrugated or threaded ends of the two members having each a special finish or construction, whereby a desired coöperation of the two opposing members when adjusted to join is effected.

In its more subordinate features my invention consists in certain novel details of construction and peculiar combination of parts, all of which will hereinafter be fully described, and specifically pointed out in the appended claims, reference being had to the accompanying drawings, in which—

Figure 1 is a side elevation of two pipe-sections constructed in accordance with my invention joined. Fig. 2 is a side elevation of the two opposing pipe ends separated. Fig. 3 is a vertical section thereof. Fig. 4 is a similar section taken on the lines 4 4 of Fig. 3, the lapped ends or beaded portions of the pipes being illustrated on an enlarged scale to the more clearly present their structure. Fig. 5 is a horizontal section of the upper section and taken on the line 5 5 of Fig. 4. Fig. 6 is a top plan view of the lower pipe-section. Fig. 7 is a detail sectional view of the lower non-crimped end of the pipe-section, taken on the line 7 7 of Fig. 1.

Before describing in detail the peculiar construction of my pipe-sections and their interlocking or joining ends I deem it proper to state I am aware that pipe-sections having threaded ends or spiral lugs and the like for interlocking with each other have heretofore been provided. My invention differentiates from what has heretofore been done in this line in the peculiar manner in which the threaded ends of two opposing pipe-sections are formed *per se* and in their relation to each other, and the differentiating features I shall now specifically describe.

Each pipe-section is made up of a blank bent about a former and with its edges clamped by a suitable beading-machine. In my construction the pipe-sections A and B have their body or main part joined by turned-back hook-flanges $a\ b$, (see, for example, Fig. 6,) which after being interlocked are run through a suitable pressing-machine in any well-known manner. Each pipe-section A and B is formed with a screw portion $a^x\ b^x$, which portions in my form of pipe-joint are not cut into the metal, but are formed by mashing or crimping the said ends by compressing mechanism of any well-known construction adapted therefor. To provide for a quick interthreading of the screw ends of the two opposing pipe-sections A and B and also to produce a very strong and durable joint, the turned-back or bead portion $b$ of the section B, which I shall term the "outer" section, as the other or inner section A fits therein, extends up the full length of the crimped portion, and said bead is also crimped, so that a practically uniform, continuous, and reinforced threadway is thereby produced. As the blanks from which the several pipe-sections are formed are uniform and as the several sections have a like diameter, the threaded portion of the opposing section A is specially shaped for conveniently interlocking with the threaded end of the section B without unnecessarily binding therewith. For this purpose the beaded portion $a$, which is shaped in cross-section the same as the beaded portion $b$ of section B, (see Fig. 6,) does not extend the full length of the section A and stops at a point about two-thirds the distance from the end of the threaded or crimped part $a^x$. The ends $a^2\ a^2$ of the section A overlap, as shown in Fig. 5.

It will be manifest that as the end $x$ of the section A has its overlapped portions of but two thicknesses of metal the said end can be readily sprung into the threaded end of the opposing section, and to further facilitate such connection of parts the receiving end of section B may have its upper edges slightly bent outward, as at $b^3$. (See Fig. 1.) By extending the doubled-over beaded portion of section A part way the length of its corrugated or crimped end additional strength, as also a more rigid connection of the two lap portions, is obtained for the penetrating end of the said member A.

For conveniently joining a section with another connection not having a threaded portion one end of the sections A and B is finished off smooth, as at $b^5$ $a^5$, and to give the said ends sufficient elasticity to admit of their being readily contracted to fit into another pipe or other tubular connection or to expand to a limited degree to receive such connection the beaded or interlocked edges terminate at a point above the outer edge of said ends, as indicated by $c$, and the remaining portions of said ends are slitted, as at $c'$, with their adjacent split edges lapping. (See Fig. 1.)

From the foregoing description, taken in connection with the drawings, it is thought the advantages of my invention will be readily apparent.

It is obvious that my form of pipe-sections is applicable for use as an offtake or feedway for smoke, gas, water, oil, cotton, wool, or for whatever purpose sheet-metal piping is used, and by reason of the convenient manner in which the sections can be joined the same are found especially useful for stovepipes, smoke-stacks, mill and gin flues, grain-elevators, &c.

Having thus described my invention, what I claim, and desire to secure by Letters Patent, is—

1. A pipe-joint comprising in combination, the two sections A and B, the opposing ends of which have spiral interlocking crimps, each section having its meeting edges bent back upon themselves, and the bent portions interlocked and pressed into a longitudinal reinforcing-bead, the reinforcing-bead of one section extending the full length of its crimped end, and the bead of the other section extended partially over the crimped end, substantially as shown and for the purposes described.

2. A pipe-joint of the character described, comprising two sheet-metal pipe-sections of like diameter, the opposing ends of which are crimped spirally to interlock with each other, each section having its meeting edges bent back upon themselves and interlocked with each other to form a reinforce-bead, the bead in one section extending the entire length of the crimped portion, the bead in the other section extending partly over the crimped end from the base thereof, the outer extremity of the meeting edges of the last-named section being crimped and overlapping each other, substantially as shown and described.

3. A pipe-joint comprising in combination, two pipe-sections of like diameter, the opposing ends of which are crimped spirally to interlock with each other, one of said sections having the meeting ends of the full length of the crimped portion bent back upon themselves and interlocked to form a reinforcing-bead, the other section having the meeting ends bent back upon themselves and interlocked for a portion of the crimped end and the meeting ends of outer extremity of said crimped ends loosely overlapping, whereby to provide for reducing the diameter of the said end of the crimped portion for the purposes specified.

GUSTAVUS HANNIBAL WEST.

Witnesses:
D. A. KELLEY,
JOHN H. T. HUNTER.